United States Patent [19]

Evans

[11] Patent Number: 4,556,420
[45] Date of Patent: Dec. 3, 1985

[54] PROCESS FOR COMBINATION METAL REDUCTION AND DISTILLATION

[75] Inventors: Harmon A. Evans, Moses Lake, Wash.; Young Jin Kwon, Fruit Heights, Utah

[73] Assignee: Westinghouse Electric Corp., Pittsburgh, Pa.

[21] Appl. No.: 546,601

[22] Filed: Oct. 27, 1983

Related U.S. Application Data

[63] Continuation-in-part of Ser. No. 373,588, Apr. 30, 1982, abandoned.

[51] Int. Cl.$^4$ .............................................. C22B 34/10
[52] U.S. Cl. ....................................... 75/84.5; 266/905
[58] Field of Search ............... 75/84.4, 84.5; 373/109, 373/110, 112, 115; 266/271, 171, 205, 905

[56] References Cited

U.S. PATENT DOCUMENTS

| | | | |
|---|---|---|---|
| 2,782,118 | 2/1957 | Hood | 75/84.5 |
| 2,787,539 | 4/1957 | Conklin | 75/84.5 |
| 2,816,828 | 12/1957 | Benedict et al. | 75/84.5 |
| 2,882,143 | 4/1959 | Schmidt et al. | 75/84.5 |
| 2,942,969 | 6/1960 | Doyle | 75/84.5 |
| 3,158,671 | 11/1964 | Socci | 266/905 |
| 3,692,294 | 9/1972 | Ishimatsu et al. | 75/84.5 |
| 3,715,205 | 2/1973 | Ishizuka | 75/84.5 |
| 3,966,460 | 6/1976 | Spink | 75/84.5 |
| 4,105,192 | 8/1978 | Ishimatsu et al. | 75/84.5 |
| 4,242,136 | 12/1980 | Ishizuka | 75/84.5 |
| 4,285,724 | 8/1981 | Becker et al. | 75/84.5 |
| 4,441,925 | 4/1984 | Ishizuka | 75/84.5 |

FOREIGN PATENT DOCUMENTS 1084923 6/1960 Fed. Rep. of Germany ....... 75/84.5

Primary Examiner—L. Dewayne Rutledge
Assistant Examiner—John J. Zimmerman
Attorney, Agent, or Firm—R. A. Stoltz

[57] ABSTRACT

A combination reduction, distillation, reducing metal recovery furnace and process of using the same comprising a pair of vertically displaced vessels in fluid communication wherein the upper vessel contains a perforated inner liner and means to at least periodically charge the top of the vessel with the metal salt to be reduced and a reducing metal, and wherein the lower vessel has a means to periodically withdraw the molten reducing metal salt produced by the redox reaction occurring within the furnace. By initially charging the furnace with sufficient reducing metal salt to establish a liquid level to provide a liquid seal above the bottom of the inner liner and by maintaining this level during the redox reaction, the inner liner can be filled with solid phase reduced metal produced by the reaction (and no reduced metal is produced outside of the liner). Upon completion, the molten reducing metal salt is drained from the furnace, the lower vessel is cooled and the unreacted reducing metal is distilled from the upper vessel and collected in the lower vessel. The unreacted reducing metal can be recycled to the subsequent run by loading a quantity of reducing metal salt into upper vessel and melting it. The reducing metal in the lower vessel is then melted and allowed to float up into the inner liner of the upper vessel where it provides a portion of the reducing metal required for the subsequent run. Such a process and apparatus is useful in producing large quantities of high purity metal such as Zr, Ti, Hf and the like.

1 Claim, 1 Drawing Figure

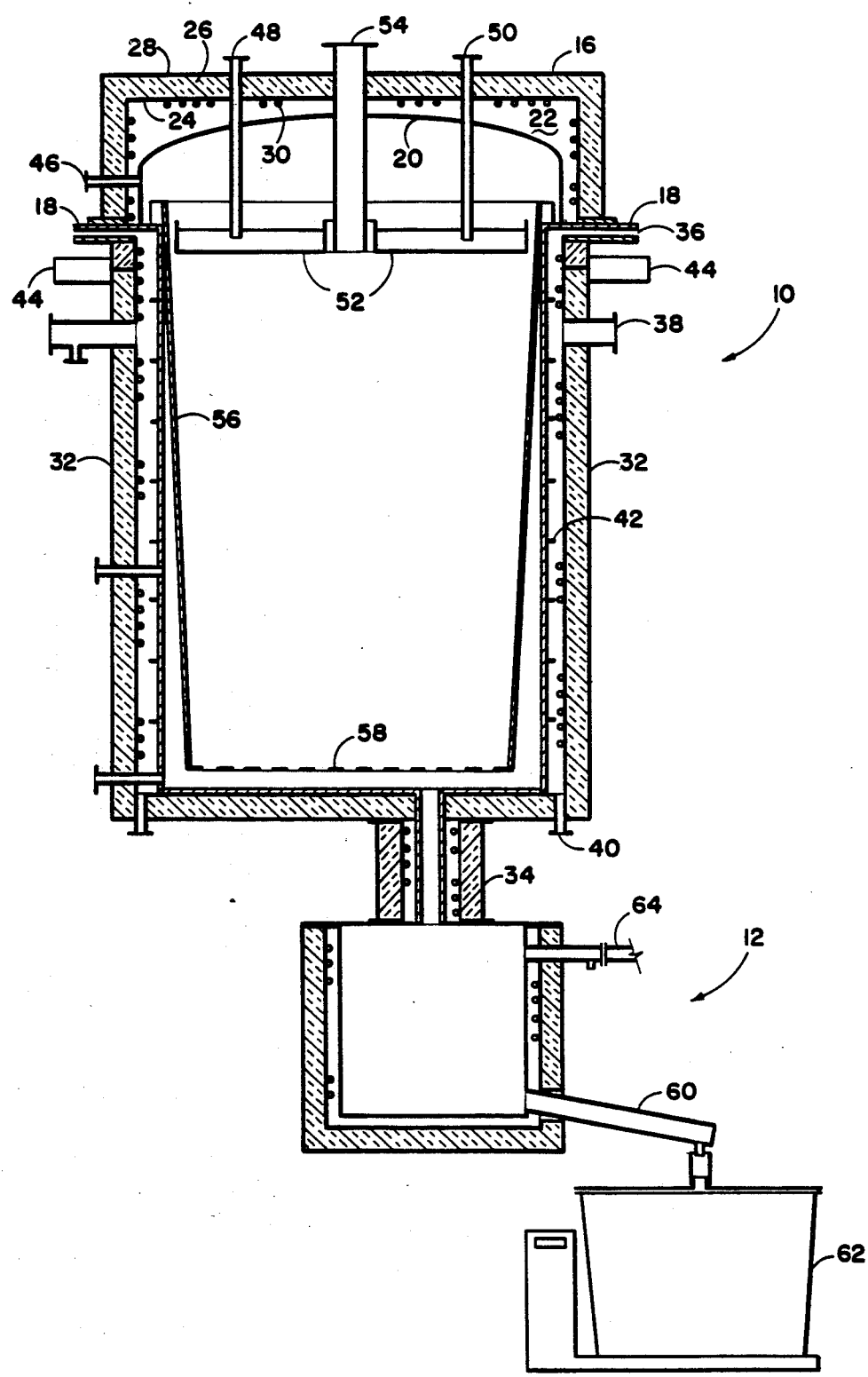

PROCESS FOR COMBINATION METAL REDUCTION AND DISTILLATION

CROSS REFERENCE TO RELATED APPLICATION

This is a continuation-in-part of Ser. No. 373,588, filed Apr. 30, 1982, now abandoned.

BACKGROUND OF THE INVENTION

1. Field of the Invention:

This invention relates to an improved method and apparatus for recovery of a reduced, purified metal. More specifically, the invention relates to an improved reduction, distillation furnace for recovery of a reduced metal and any unused reducing metal.

2. Description of the Prior Art:

Technical and patent literature reports numerous methods for separating and recovering various metals. Frequently the processes will involve the isolation of a purified salt of the metal to be recovered and a subsequent chemical reduction involving the addition of at least a stoichiometric amount of a more active reducing metal. The reduction step will then be followed by an appropriate separation of the desired elemental form of the metal from any excess reducing metal and reducing metal salt formed during the displacement reaction. In contemporary commercial scale production (i.e., production involving tonnage quantities of free metal) and in particular in the recovery of such metals as titanium, zirconium, hafnium, and the like, the overall reduction and recovery process is a batchwise series of high temperature and high vacuum steps.

Thus, for example, in the production of zirconium intended for use as a structural material in nuclear reactor applications, a hafnium-free, highly purified zirconium halide (e.g. $ZrCl_4$) is loaded into a vessel or retort. Typically, this reduction retort is a cylindrical soft iron vessel having a centrally located cylindrical (angel-food cake pan) inner wall with the $ZrCl_4$ loaded into the doughnut shaped annular cavity. After isolation of the $ZrCl_4$ in this annular cavity and cooling of the retort, it is placed on top of a crucible filled with at least a stoichiometric amount of a reducing metal (e.g. magnesium, sodium or the like). A lid is sealed on top of the retort and the crucible is welded to the retort thus creating a hermetically sealed retort assembly. This retort assembly is then evacuated to create the desired oxygen-nitrogen free inert atmosphere and placed in a reduction furnace wherein the retort assembly is heated to a temperature of the order of approximately 825° C. for a sustained period of time. Under these conditions the $ZrCl_4$ will evaporate and diffuse into the lower crucible containing the magnesium reducing metal and therein react, producing elemental zirconium and magnesium chloride.

Upon completion of the reduction reaction, the retort assembly is cooled and the crucible and retort are milled apart. The retort is then cleaned and returned to the $ZrCl_4$ charging step. The crucible containing the reaction products is sent to an area where the products are removed and most of the $MgCl_2$ layer is physically separated from the sponge zirconium layer. A series of zirconium sponge layers is collected from several crucibles (reduction batch runs) and stacked within the upper portion of a distillation vessel, typically on a support grid separating the upper and lower compartments. This distillation vessel is then hermetically sealed and under vacuum (<20 microns) the upper compartment is maintained at a high temperature (approximately 1050° C.) for a period sufficient to melt and distill the $MgCl_2$ and any unreacted magnesium. After cooling and conditioning the distillation vessel, the magnesium chloride and magnesium in the lower compartment is removed and the desired zirconium sponge disc is withdrawn from the support grid and sent on to final product handling and fabrication.

There are several shortcomings associated with such a process. First it is labor intensive in materials handling and requires two full heat-ups from room temperature. Also, the process is long and time consuming. The in to out process time cycle on a commercial scale is approximately 16 to 20 days in length.

SUMMARY OF THE INVENTION

In view of the problems associated with previously known methods and apparatus employed in chemically reducing and physically recovering purified zirconium and the like, I have discovered an improved furnace and associated process for performing the reduction, distillation and recovery of excess reducing metal and reaction products in a single unit. This improved furnace comprises:

(a) a reaction vessel having an inner liner and a predetermined amount of molten reducing metal salt therein to provide a molten salt surface above the bottom of the liner, whereby a seal is provided to prevent molten reducing metal from flowing into the annulus between the inner liner and the reaction vessel;

(b) a means to introduce a reducing metal into the reaction vessel;

(c) a means to introduce a metal salt to be chemically reduced into the reaction vessel;

(d) a means to withdraw liquid from the lower portion of the reaction vessel such as to selectively control the level of the molten salt surface within the reaction vessel;

(e) a means to initially create a vacuum within the furnace; and (f) a means to heat the furnace to a temperature consistent with the occurrence of the desired reduction reaction and also to a temperature consistent with the occurrence of the desired distillation reaction.

In one particular embodiment of the invention, the furnace is provided with first and second compartments or vessels in fluid communication with each other. The first compartment contains an inner liner with at least one opening in the lower portion of the liner for allowing fluid transfer therethrough and the inner liner is adapted to confine solidified elemental metal produced within the first compartment by the chemical reducing reaction occurring therein. Preferably, in such an embodiment, a means is provided to selectively maintain the compartments at different temperatures while drawing a vacuum on the furnace.

The present invention further preferably provides that the first compartment is an upper compartment and the second compartment is a lower compartment and the compartments are separate vessels interconnected by a conduit and that the upper compartment can be opened in a manner such as to facilitate removal of an inner liner containing the reduced metal. The invention can also provide a pan suspended within the upper chamber and above the reducing metal layer to vaporize the metal salt to be reduced. A removable external heater around the lower compartment can be provided to selectively maintain the lower compartment temperature below the temperature of the upper compartment during distillation of unreacted reducing metal.

Thus, the associated process of the present invention involves in a reduction, distillation furnace wherein a metal salt to be reduced reacts with a reducing metal to produce by way of a redox reaction a desired solid reduced metal phase and a corresponding molten reducing metal salt, the specific improvement comprising:

(a) initially charging a furnace with sufficient reducing metal salt to establish a molten salt seal in the furnace above the bottom of an inner liner;

(b) establishing and maintaining a temperature and pressure within the furnace consistent with promoting the desired redox reaction;

(c) at least periodically adding the metal salt to be reduced and at least a stoichiometric amount of reducing metal to the furnace;

(d) at least periodically removing a portion of the molten metal-reducing salt to readjust the molten salt surface whereby the amount of the solid reduced metal phase that can be formed by the redox reaction is increased;

(e) upon completion of the redox reaction, removing the molten metal-reducing salt phase from the furnace;

(f) removing any unreacted reducing metal from the furnace by distillation thus isolating purified solid reduced metal; and (g) recovering the purified solid reducing metal from the furnace.

In the preferred embodiment separate first and second compartments or vessels are used with the inner liner being present in the first. The molten salt seal is maintained above the bottom of the inner liner until after the reduction phase is completed. Then most of the molten metal-reducing salt and unreacted reducing metal is removed by draining the liquid phase. The remaining metal-reducing salt and unreacted reducing metal is removed by maintaining the first vessel at a temperature above the temperature of the second vessel while pulling a vacuum on the furnace. The purified reduced metal can be rapidly and easily recovered by opening the upper vessel and withdrawing the inner liner. Because the molten salt seal is provided above the bottom of the inner liner prior to the melting of the reducing metal and is maintained above the bottom of the inner liner until the redox reaction is completed, essentially no purified reduced metal is between the inner liner and the upper vessel, thus the inner liner is easily removed.

It is a primary object of the present invention to provide a combination reduction, distillation, reducing metal recovery furnace. It is an additional object that this furnace be capable of producing purified metal in a semi-continuous process involving a single heat-up and cool-down cycle in one unit and providing for rapid removal of the reduced metal. Fulfillment of these objects and the presence and fulfillment of other objects will be apparent upon complete reading of the specification and claims taken in conjunction with the attached drawing.

BRIEF DESCRIPTION OF THE DRAWING

FIG. 1 is a simplified partial cross-section view of a combination reduction, distillation, reducing metal recovery furnace according to the present invention.

DESCRIPTION OF THE PREFERRED EMBODIMENTS

The reduction, distillation furnace and associated method of the present invention, how it differs from the prior art, and the advantages over what has previously been used can perhaps be best explained and understood by reference to the drawing. Illustrated in the drawing is a simplified cross-sectional view of a preferred embodiment involving an upper vessel or compartment, generally designated by the numeral 10, and a lower vessel or compartment, generally designated by the numeral 12.

The upper vessel 10 is an enclosed, sealed reaction vessel having a removable top portion 16 that separates from the remainder of the vessel along the shelf 18. This removable top or lid 16 is constructed of an inner surface 20 of sheet steel with an air space 22 behind it. The inner wall 24 is another layer of sheet steel backed by a layer of insulation 26 which in turn is covered with an external layer of sheet steel 28. Within the air gap 22 and attached to the inner wall 24 is a series of electrical heating elements 30. The sidewalls 32 of the upper vessel 10 below the shelf 18, the conduit 34 connecting the upper vessel 10 with the lower vessel 12, and the lower vessel 12 are constructed of essentially the same sequence of layers. While the air gap in the lid 16 and the lower vessel 12 are essentially static, the sidewalls 32 of upper compartment 10 are equipped with ports 36, 38 and 40 and with spiral cooling fins 42 to facilitate air movement and cooling when required. The upper portion of the sidewalls 32 are also provided with an expansion joint 44 to account for dimensional changes associated with the heat-up and cool-down cycles of the furnace operation.

The removable top or lid 16 is also provided with an evacuation port 46 through which a vacuum can be pulled on the top of the furnace. A pair of inlet conduits 48 and 50 lead through the top to a suspended vaporization pan 52 for introducing volatile metal salt to be reduced. A centrally located inlet conduit 54 is provided for introducing a reducing metal and reducing metal salt into the furnace below the vaporization pan 52. When removable lid 16 with attached vaporization pan 52 is removed, the inner liner 56 resting on the inner portion of shelf 18 can be withdrawn from the upper chamber 10. This inner liner 56 is equipped with at least one perforation in its bottom 58 that allows for fluid transfer from within the inner liner to the lower compartment or vessel 12 via conduit 34.

This lower vessel 12 is also a sealed furnace with preferably the heating elements and insulation being of a clamshell or removable nature. The lower portion of the vessel 12 is equipped with a valved spigot 60 for draining liquid from the furnace into the reduced metal salt receptacle 62. The vessel 12 is also equipped with an evacuation port 64 for distillation of any unreacted reducing metal after the redox reaction is finished and the molten reducing metal salt has been drained from vessel 12.

In order to operate the improved furnace according to the present invention, the unit is either initially charged with a desired amount of the reducing metal salt and then sealed, or the unit is sealed and tested for leaks and then charged with the reducing metal salt through appropriate valving (not shown) and conduit 54. The furnace can then be brought up to the desired operating temperature and a vacuum created within the furnace via evacuation line 46 and appropriate external valving and vacuum pump (again not shown). The appropriate or desired amount of reducing metal salt corresponds to the quantity of salt required to establish a liquid phase interface of molten reducing metal salt (molten salt surface) to provide a seal at the inner liner bottom 58; i.e., the amount of molten salt required to fill the lower vessel 12, the conduit 34, and the lower portion of upper vessel 10. The molten salt surface can then be adjusted upward by adding additional salt through conduit 54 and adjusted downward by draining liquid from the lower vessel 12 via spigot 60. Also in this manner, the liquid level of the molten reducing metal salt can be maintained to provide a seal above the liner bottom 58 which is viewed as an essential and novel process step of the invention.

Having achieved the desired liquid level within the upper vessel 10 and the appropriate temperature and vacuum, the reactants to the redox reaction can be introduced. The reducing metal is added to the inner liner via inlet conduit 54 thus establishing a molten reducing metal layer on top of the salt layer inside the inner liner. The metal salt to be reduced, usually a metal halide, is added to the vaporization pan 52 via inlet conduits 48 and 50. At the selected conditions the metal halide in the vaporization pan distills (evaporates) and diffuses into the region directly above the molten reducing metal where it reacts with the reducing metal according to the redox reaction producing more reducing metal salt and the desired reduced metal to be recovered. The molten metal salt produced by the reaction physically settles to the bottom while the reduced metal phase continues to grow to what is ultimately a spongelike solid phase confined to the interior of the inner liner 56. As excess reducing metal salt phase is produced by the redox reaction, spigot 60 is opened and additional space in the furnace then becomes available for more metal production. The process of at least periodically (possibly continuously) adding reducing metal and metal halide reactants and the periodic removal of reducing metal salt continues until the entire available space within the inner liner is filled with the desired metal sponge phase. At this point the addition of metal halide reactant and the reducing metal stops and the redox reaction ceases. This should occur with an excess over the stoichiometric amount of reducing metal having been added such that the metal salt being reduced is for all practical purposes the limiting chemical factor. This is important in that the excess unreacted reducing metal can be removed from the reduced metal and pyrophoric subchlorides, for example, are avoided.

Having completed the run, the liquid reducing metal salt phase is then withdrawn through spigot 60 while (optionally) an inert gas is being added to the top of the furnace via conduit 54 or other inlet conduit. Upon visual confirmation of excess liquid reducing metal exiting spigot 60, the spigot is closed. The lower vessel is cooled and then evacuated by using the appropriate valves and vacuum (not shown) via port 64. During this step the heating elements on the lower vessel 12 are preferably removed to allow the temperature of the lower chamber to drop below the temperature of the upper chamber which is simultaneously maintained at a temperature that promotes the distillation of any reducing metal entrained in the reduced metal product. This step is continued until no additional reducing metal can be distilled from the furnace whereupon the furnace is filled with an inert gas and the heater is turned off.

Cooling air can then be circulated through ports 36, 38 and 40 of upper vessel 10 to cool the entire furnace and contents back to ambient conditions.

There are several advantages associated with the present furnace and its use. Primarily the improved furnace performs both the reduction step and distillation step in a single reactor with only one heat-up and cooldown cycle. Consequently there is a significant savings in labor, energy expenditure, and operating supplies. Furthermore the in-process inventory is significantly reduced and the maintenance costs are anticipated to be much lower. The reducing metal efficiency is also expected to be very high (in excess of 95% for Mg).

In addition, the excess magnesium (or other reducing metal) can be recycled and introduced into the next batch without extra handling. After a run, the excess magnesium is in the lower vessel 12 (some was drained into it and the remainder collected there during the distillation step) along with some salt (e.g. magnesium chloride), the remainder of the salt having been drained into salt receptacle 62. To start the next batch, another inner liner is placed into the upper vessel 10 along with a predetermined quantity of salt (again e.g. MgCl). The vessel 10 is sealed and heated to melt the salt which then flows down into the bottom of the upper vessel 10 and down into the top of the lower vessel 12. The lower vessel 12 is then heated and the excess magnesium melts and, being lighter than the MgCl floats up into the upper vessel where it can react, thus being recycled into the next batch without manual handling.

As used herein, the phrase "seal at the bottom of the inner liner" means a molten salt level high enough to prevent the less dense molten reducing metal from flowing out from the bottom of the inner liner into the annulus between the inner liner 56 and the upper vessel 10.

The particular metal to be recovered in the furnace described herein, in the broadest sense, can be any metal that in the elemental form remains in the solid state at the redox conditions being employed, and also provided that the reducing metal salt being formed is a liquid at these conditions. Preferably the metal salt to be reduced is volatile at the furnace operating conditions. Therefore, such compounds as zirconium chloride, titanium chloride, and hafnium chloride are particularly useful in the present invention. However, other halides of these metals and generally other metal halides such as metal chlorides, bromides, iodides or fluorides which react with reducing metals (particularly alkali or alkaline earth metals such as sodium, potassium, lithium, magnesium, calcium and the like) to produce the elemental form of the metal are to be considered equivalent for purposes of this invention. In such cases an alternative to the vaporization pan to distribute the reactant can readily be employed in the top of the furnace. Any appropriate means well known in the art to accomplish the task, in principle, can be employed; for example, spray nozzles, sprinkler pipes, powder distributors and the like.

The overall shape and configuration of the vessels making up the furnace is somewhat arbitrary provided the basic concept of establishing and readjusting the molten salt surface during operation or its equivalent is present. Thus the furnace can be a single vessel with the perforated inner liner or the equivalent (such as perforated partitions, weirs, baffles or the like for establishing the first and second compartments, or the unit can be two separate vessels. The separate vessels in fluid communication can be side by side or vertically displaced (as illustrated) with the position of molten salt removal being appropriately selected. Various well known engineering and design principles can be readily employed such as heat tracing of various pipes, valves and other equipment. Portholes and manways can be provided for access for repair, or for rodding out the condensed solid deposit from pipes and the like. Recirculation of molten reducing metal salt for liquid level maintenance can be incorporated. And various measurements can be employed during operation to monitor the progress of the redox reaction including weight of reactants, weight of reducing salt withdrawn, liquid level detection and the like.

Having thus described and exemplified the preferred embodiments with a certain degree of particularity, it is manifest that many changes can be made in the details of the construction and operation, the arrangement of components, the operating parameters and the implementation of the steps without departing from the spirit and scope of this invention. Therefore, it is to be understood that the invention is not limited to the embodiments set forth herein for purposes of exemplification, but is to be limited only by the scope of the attached claims, including a full range of equivalents to which each step thereof is entitled.

I claim:

1. In a reduction process wherein a furnace having an inner liner is used and wherein one of $TiCl_4$, $HfCl_4$ or $ZrCl_4$ to be reduced reacts with Mg to produce, by way of a redox reaction, a desired corresponding solid Ti, Hf or Zr metal phase and molten $MgCl_2$, the specific improvement comprising:

(a) initially charging a furnace having a first vessel containing said inner liner having at least one opening in the lower portion thereof and said first vessel being in fluid communication with a second vessel of said furnace, said charging being with sufficient $MgCl_2$ to establish a molten salt seal at the bottom of said inner liner;

(b) establishing and maintaining a temperature and pressure within said furnace consistent with promoting said desired redox reaction;

(c) at least periodically adding said $TiCl_4$, $HfCl_4$ or $ZrCl_4$ to be reduced and at least a stoichiometric amount of Mg to said furnace;

(d) at least periodically draining a portion of said molten $MgCl_2$ to readjust said molten salt surface whereby the amount of said corresponding solid reduced Ti, Hf or Zr that can be formed by the redox reaction is increased while the seal is maintained;

(e) upon completion of said redox reaction, draining said molten $MgCl_2$ salt and at least a portion of the excess Mg from said furnace;

(f) removing unreacted Mg metal from said furnace by distillation by maintaining said first vessel of said furnace at a temperature above the temperature of said second vessel while pulling a vacuum on said furnace, thus isolating purified solid Ti, Hf or Zr metal;

(g) recovering said liner and said purified solid Ti, Hf or Zr metal from said furnace, whereby the production of said Ti, Hf or Zr metal outside the liner is avoided, thus facilitating removal of the liner and reduction and whereby distillation of large quantities of high purity metal is achieved; and (h) loading and melting reducing metal salt in said first vessel and then melting reducing metal and reducing metal salt remaining in said second vessel from a previous run, whereby reducing metal floats up into the inner liner of said first vessel thereby recycling said reducing metal.

* * * * *